July 19, 1938.  A. T. NEWELL  2,124,312
LOOSE LEAF BINDER
Filed Dec. 18, 1935    2 Sheets-Sheet 1

INVENTOR.
Arthur T. Newell.
BY S. J. Cox.
ATTORNEY.

July 19, 1938. A. T. NEWELL 2,124,312
LOOSE LEAF BINDER
Filed Dec. 18, 1935 2 Sheets-Sheet 2
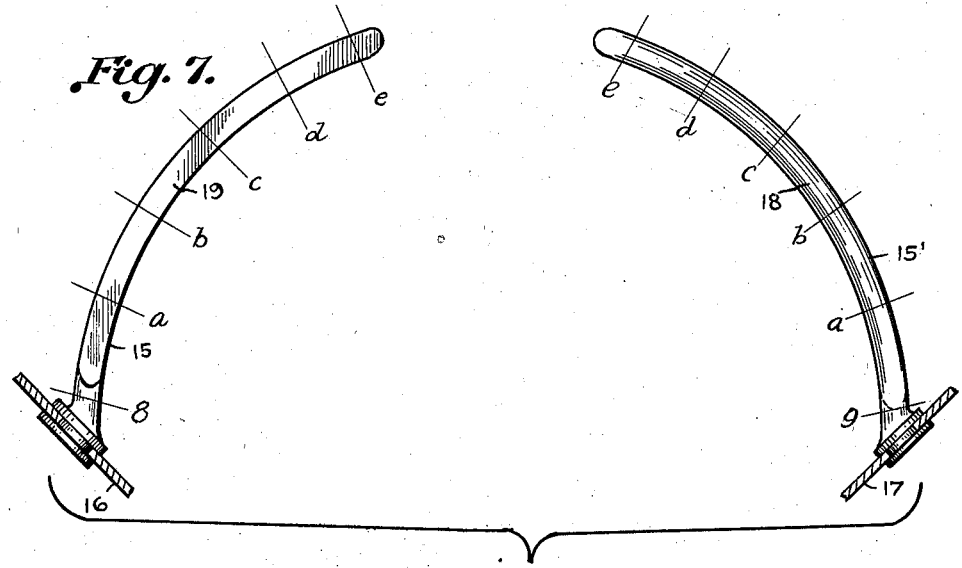
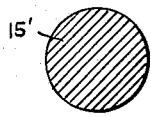
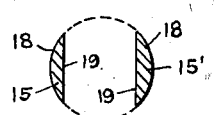
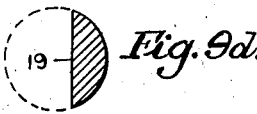
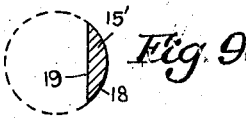
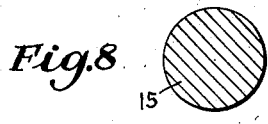
INVENTOR.
Arthur T. Newell
BY
S. J. Cox,
ATTORNEY.

Patented July 19, 1938

2,124,312

UNITED STATES PATENT OFFICE 2,124,312

LOOSE LEAF BINDER

Arthur T. Newell, Hempstead, N. Y., assignor to
The C. E. Sheppard Co., Long Island City, N. Y.,
a corporation of New York Application December 18, 1935, Serial No. 54,987

4 Claims. (Cl. 129—17)

The present improvements relate, in general, to loose leaf binders and more particularly to that type of binder having rigid posts or prongs on which perforated sheets may be retained.

So-called "ring binders" have been devised wherein oppositely mounted posts or ring sections overlap side by side and are telescoped by the elongated hole formed by a stack of perforated sheets. Other binders also employ overlapping post sections adapted to occupy a common perforation in a sheet. The present improvements are primarily directed to binders of those types, but the features may obviously be employed in other binders or for other purposes without departing from the invention.

A primary object is to provide an improved post structure for loose leaf binders wherein the sections of the posts are complementary, and wherein free opening and closing of the covers and posts are insured. Another object is to provide a novel post structure which facilitates the addition or removal of sheets.

A further object is to provide an improved loose leaf binder which insures the nesting of the posts or prong in the proper manner and prevents the prongs from overlapping each other on the wrong side. Accordingly, the provision of opposed prongs, which, when open, have spaced free ends, constitutes a further object of the improvements.

Another object is to provide a prong or post for loose leaf binders, having an inclined or diagonal face. A further object is to provide a pair of complementary posts or prongs of varying cross section whereby their free ends are spaced when moved apart.

A still further object is to strengthen the posts or prongs of a binder so as to increase their rigidity and capacity.

Other objects may be apparent to those skilled in the art upon reference to the accompanying specification and drawings in which—

Fig. 7 is an enlarged view of the posts or prongs of Figs. 1–6;

Figs. 8 to 8e are group views of six sections (enlarged taken respectively on lines 8, a, b, c, d and e of prong 15 of Fig. 7;

Figs. 9 to 9e are group views of six sections (enlarged) taken respectively on lines 9, a, b, c, d and e of prong 15' of Fig. 7;

Fig. 10 is an arbitrary view, showing the relation of Fig. 8e and Fig. 9e, when the prongs are moved to a position where the section lines F and F' are common.

Figure 1:
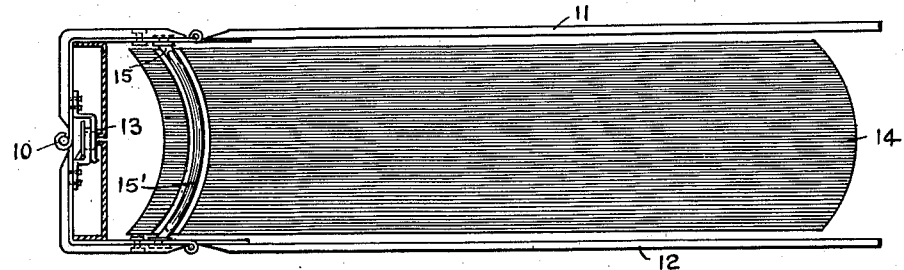
Fig. 1 is an end elevation, some parts being broken away, illustrating one form of the improvements, applied to one type of binder.
Figure 2:
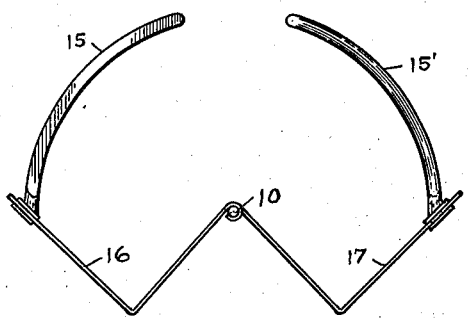
Fig. 2 is a fragmentary showing of the posts or prongs apart or open.

Referring to the drawings, only one embodiment of the invention is illustrated. It is understood, however, that the improvements are adapted for embodiment in binders employing straight posts or curved posts.

In the embodiment shown in Fig. 1, the improvements are illustrated in connection with a hinged binder having arcuate posts or prongs. The back of the binder is hinged as at 10, and covers 11 and 12 are hinged thereto in a well known manner. A releasable latch 13 maintains the covers locked in the position of Fig. 1, where sheets 14 are retained on posts or prongs 15 and 15'.

Figure 4:
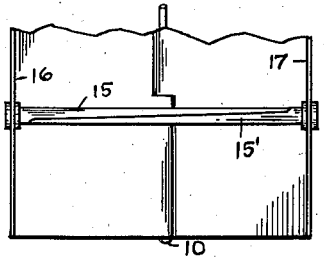
Fig. 4 is a plan view of a fragment of the binder showing the posts or prongs in closed or nested relation.

The sheet-impaling members 15, 15', in the present embodiment, are mounted or anchored on supports 16 and 17 which may be part of the covers, or back, depending upon the character of the binder. As illustrated in Fig. 4, these prongs are oppositely disposed, one being mounted on one support and the other on the other support so that they overlap within a small diameter, and within the same perforation of a sheet. Two or more sets of such complementary prongs may be provided, as seen in Fig. 6.

Figure 6:
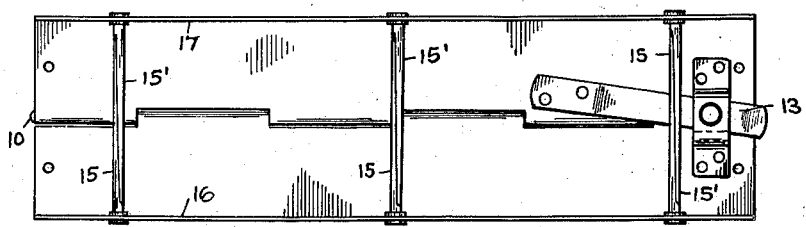
Fig. 6 is a plan view of a fragment of the binder.

As illustrated, the prongs are contoured so as to nest along each other when the binder is closed (see Figs. 4 and 6). In the illustration, the prongs are similar in shape so as to be complementary. However, their contour is not limited to any particular shape so long as the essentials of the improvements are preserved.

In the present form the prongs 15, 15' are arcuate and substantially D-shaped, the outside faces 18 being rounded or cylindrical while the inside adjacent or contiguous faces 19 are flat. It is noteworthy, that the pair of prongs when nested, occupy substantially a circumference, thereby providing a cylindrical post from cover to cover (Fig. 4). Since each prong of the pair is mounted at substantially the same relative position on the prong-supports 16 and 17, opening and closing of the supports, moves the prongs through the same relative arcs.

Figure 5:
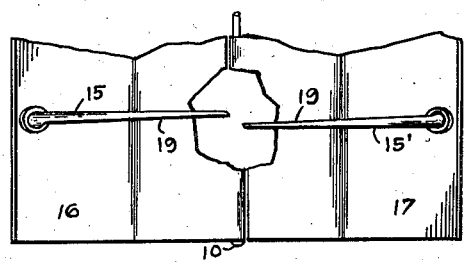
Fig. 5 is a view similar to Fig. 4 showing the posts or prongs in an open position wherein the prongs have just passed out of register with each other.

As seen in Fig. 4, the outer faces of the prongs are substantially parallel. As seen in Fig. 5, the inner faces of the prongs are likewise substantially parallel. However, the inner faces are disposed at angles to the outer faces so that when nested as in Fig. 4, the inner faces occupy substantially a common diagonal plane.

This result is derived by having the inside faces 19 of the prongs inclined or beveled. This contour of the prongs may be best observed upon reference to Figs. 8 to 8e and Figs. 9 to 9e. It is significant, that the tapering face originates short of the fixed end of the prong so that the entire cross section or circumference of the prong (see sections on lines A, A'), is preserved at the base where the prong is anchored. This affords a firm foundation to the cantilever prong, and imparts rigidity and sturdiness to it. Flexibility and torque are therefore reduced to a minimum.

When the prongs are apart, their sections are similar to those of Figs. 8, 8a, 8b, 8c, 8d, 8e and Figs. 9, 9a, 9b, 9c, 9d and 9e. However, when the prongs are nested, as in Fig. 4, they complement each other. This may be seen by laying Figs. 8 to 8e over Figs. 9 to 9e, whereupon the prongs cooperate along their extent, to reinforce each other and provide a single sheet retaining member. In this position, the pair of prongs forms a complete cylindrical post. When opening the binder, the prongs recede along the same arc, and occupy a cylindrical area of the same diameter. This effect is illustrated in Fig. 10, where the free ends of the prongs are shown to be in the same circle, although the prongs are apart.

Upon reference to Figs. 5 and 10, it is seen that as the prongs recede, the inside faces move apart but the outside faces do not. Accordingly, the faces 19 at the free ends of the prongs are spaced when the prongs are apart their full length. It is seen that this spacing is so great that there is practically no chance or risk, of having the prongs pass (during closing movement) on the wrong sides of each other. Even with the customary play, flexibility, and twisting which attends such structures, this spacing will still prevent the improper movement of the prongs and will prevent their tips from encountering each other.

Figure 3:
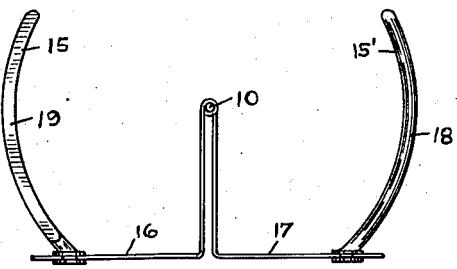
Fig. 3 is a view similar to Fig. 2, showing the limit of opening movement.

The tapering of the prong contributes maximum rigidity, and by uniformly varying the cross section, with the full section at the base, lateral bending of the prong is best resisted. This has a marked advantage in binders of this type since the entire capacity of the binder may be safely borne by prongs of one side or the other, when open, as seen in Fig. 3. The strength and rigidity of the prongs is such that no sagging due to the weight of the sheets is perceptible. Loading and unloading of the binder is greatly facilitated and accelerated. The present improvements also provide binders of larger capacity than the standard ring binder on the market without sacrificing sturdiness, and permit ready removal or insertion of any sheet with ease, or from any part of the binder without disturbing the others.

The spacing of the free ends of the prongs so as to prevent engagement thereof when being moved in closing direction is a primary object of the improvements. Accordingly, the improvements may be embodied in other forms which accomplish a similar purpose.

It is significant that the diameter of the combined prongs does not exceed that of a single, full diameter prong or post, and even the spacing of the free ends of the prongs with its attendant advantages, does not increase the diameter of the posts. Accordingly, the prongs accommodate sheets of standard perforations, and do not occupy any greater proportion of the perforation than an equivalent size of "ring" of a ring binder.

The standard ring binders at present range from one-half to two inches in capacity. There is a great demand for a binder of this type having a larger capacity but which will take the same sheets with 3 hole punching, which are standard for that type. The standard spaced prong binder requires a minimum of four prongs and four holes to preserve alignment. Accordingly, this improvement provides a binder that can be made in 3" or 4" capacity, to fit sheets punched for standard ring binders, having six tapered opposed prongs, using the standard 3 hole punching. The improvements may also be adapted to any standard 2-hole punching, using 4 tapered opposed prongs, a feature which is a departure from present standard binders of known construction. A two-hole punching may therefore now be procured in a 3 or 4 inch binder.

I claim:

1. In a loose leaf binder, a pair of oppositely disposed sheet-impaling members both positioned for occupying a common perforation of a loose leaf sheet, said members having contiguous faces overlapping in a diagonal plane.

2. In a loose leaf binder, a pair of oppositely disposed sheet-impaling members both positioned for occupying a common perforation of a loose leaf sheet, said members having contiguous faces overlapping in a plane, which, if produced, intersects the axis of one of the members.

3. In a loose leaf binder, a pair of oppositely disposed sheet-impaling members both positioned for occuping a common perforation of a loose leaf sheet, said members having contiguous faces overlapping in a curved area, which, if produced will describe a spiral.

4. In a loose leaf binder, a pair of complementary overlapping sheet-impaling members having rounded outer surfaces, said members, when nested, having a substantially circular cross section, the adjacent faces of said members being flat and disposed in a diagonal plane.

ARTHUR T. NEWELL.